US008588396B2

(12) United States Patent
Stent et al.

(10) Patent No.: US 8,588,396 B2
(45) Date of Patent: Nov. 19, 2013

(54) METHOD FOR REPORTING ACTIVITY OF MULTI-APPEARANCE CALL-CENTER AGENT

(75) Inventors: Robert Stent, Westford, MA (US); W. James Gillis, Andover, MA (US); Saeed Contractor, Pembroke Pines, FL (US)

(73) Assignee: Aspect Software, Inc., Chelmsford, MA (US)

( * ) Notice: Subject to any disclaimer, the term of this patent is extended or adjusted under 35 U.S.C. 154(b) by 1073 days.

(21) Appl. No.: 12/016,065

(22) Filed: Jan. 17, 2008

(65) Prior Publication Data

US 2009/0185672 A1 Jul. 23, 2009

(51) Int. Cl.
*H04M 3/00* (2006.01)
(52) U.S. Cl.
USPC .................. 379/265.06; 379/265.03

(58) Field of Classification Search
USPC .............. 379/265.02, 265.06, 265.07, 265.08
See application file for complete search history.

(56) References Cited

U.S. PATENT DOCUMENTS

| 7,711,104 B1* | 5/2010 | Flockhart et al. ........ 379/265.03 |
| 2005/0021529 A1* | 1/2005 | Hodson et al. ................ 707/100 |

* cited by examiner

*Primary Examiner* — Antim Shah
(74) *Attorney, Agent, or Firm* — Husch Blackwell LLP

(57) ABSTRACT

A method and apparatus are provided for monitoring activities of a plurality of agents servicing a plurality of calls for an organization. The method includes the steps of monitoring a plurality of applications on a terminal of an agent of the plurality of agents, detecting selection of an application of the plurality of applications, identifying a call associated with the selected application of the plurality of calls and saving a time of selection and an identifier of the application in a respective file or database of the identified call for future retrieval.

16 Claims, 2 Drawing Sheets

METHOD FOR REPORTING ACTIVITY OF MULTI-APPEARANCE CALL-CENTER AGENT

FIELD OF THE INVENTION

The field of the invention relates to communication systems and more particularly to contact centers.

BACKGROUND OF THE INVENTION

Contact centers are generally known. Contact centers are generally used by organizations to handle contacts with clients of the organization.

Organizations typically employ a number of agents to handle contacts with clients. Usually the agents are trained in the technology and practices of the organization to aid the agents in answering questions and/or providing help to clients of the organization.

In order to facilitate communication between the organization and its clients, the organization may promulgate (by publication or otherwise) one or more communication system addresses (e.g., telephone numbers, e-mail addresses, web sites, etc.) through which clients may contact the organization. The organization may also provide one or more communication system interfaces (e.g., private branch exchanges (PBXs), automatic call distributors (ACDs), e-mail servers, web servers, etc.) to facilitate contacts with clients. The organization may also provide a workstation for each agent that includes a telephone and terminal connected to the communication system interfaces for handling contacts with clients.

As each client is connected with an agent, the agent may converse with the client, answer questions or enter into transactions with the client on behalf of the organization. In order to answer questions or enter into a transaction with the client, the agent may access any number of databases and open many different applications in order to conclude the transaction. While existing agent tools for retrieving and entering data work relatively well, it is inherently difficult to determine the effectiveness of agent tools. Accordingly, a need exists for better methods of tracking agent activity in addressing client concerns.

SUMMARY

A method and apparatus are provided for monitoring activities of a plurality of agents servicing a plurality of calls for an organization. The method includes the steps of monitoring a plurality of applications on a terminal of an agent of the plurality of agents, detecting selection of an application of the plurality of applications, identifying a call associated with the selected application of the plurality of calls and saving a time of selection and an identifier of the application in a respective file or database of the identified call for future retrieval.

DETAILED DESCRIPTION OF AN ILLUSTRATED EMBODIMENT

Figure 1:
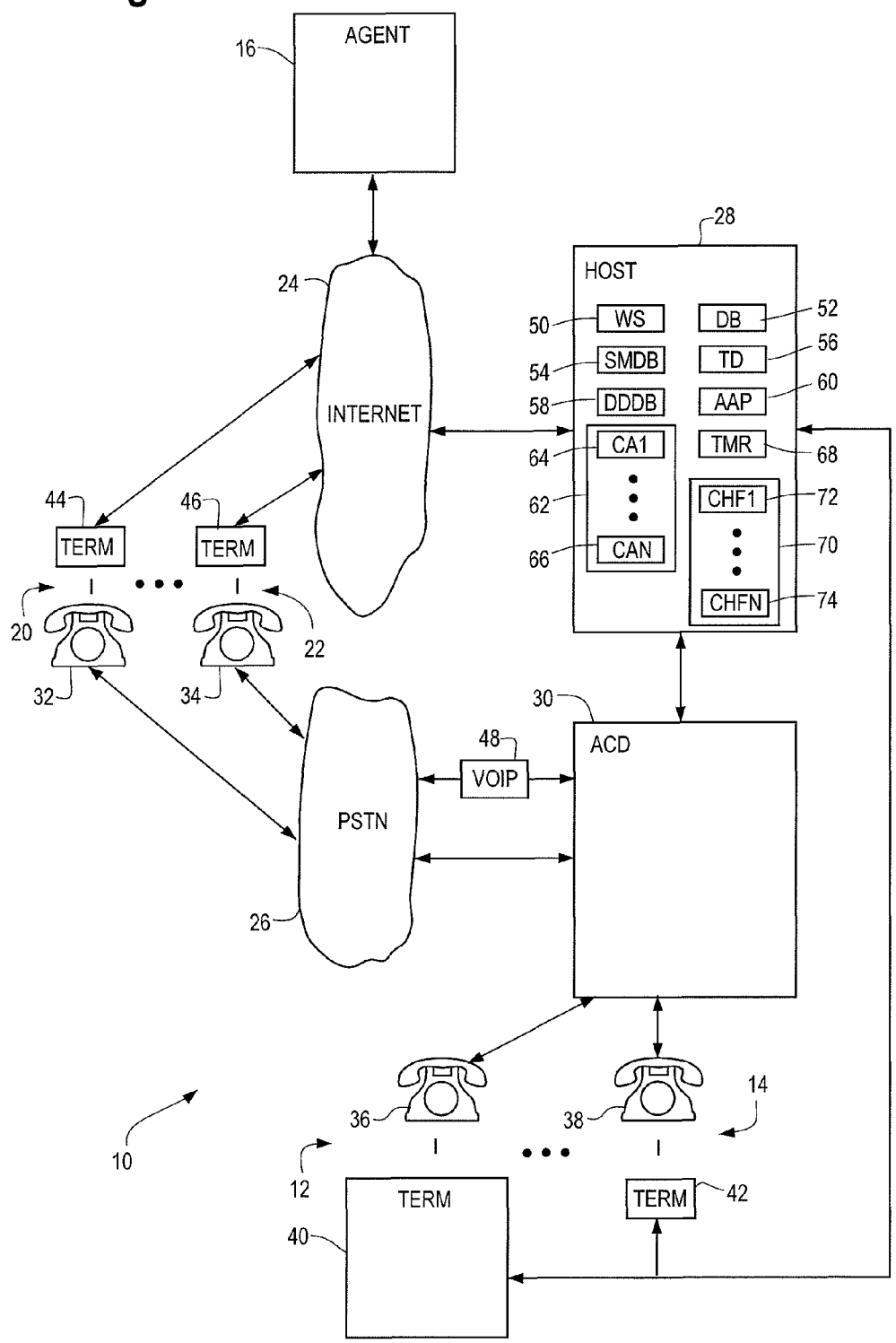
FIG. 1 is a block diagram of a call distribution system in accordance with an illustrated embodiment of the invention.

FIG. 1 shows a system 10 for monitoring agent activities shown generally in accordance with an illustrated embodiment of the invention. The system 10 may be disposed within a communication system and be used by an organization to monitor the activities of agents of the organization.

The organization may provide a number of workstations 12, 14, 16 for use by agents of the organization. The workstations 12, 14, 16 may be used by agents to make or receive calls from clients 20, 22 of the organization. Calls between agents 12, 14, 16 and clients 20, 22 may by handled under any appropriate packet format (e.g., e-mails, chat sessions, Voice over Internet Protocol (VoIP), etc.) through the Internet 24 or under an appropriate switched circuit format (e.g., voice call) via the public switch telephone network (PSTN) 30.

In order to expedite the formation and delivery of calls, the organization may provide a number of call processing centers. In the case of calls through the Internet 24, the organization may provide a host 28 that sets up calls between computer terminals 16, 40, 42 of agents 12, 14, 16 and computer terminals 44, 46 of clients 20, 22. In the case of calls through the PSTN 26, the organization may provide an automatic call distributor (ACD) 30 that sets up calls between telephones 36, 38 of agents 12, 14 and telephones 32, 34 of clients 20, 22. In the case of remote agents 16, voice calls with clients 20, 22 through the PSTN 26 may be supported via a VoIP gateway 48 with either the ACD 30 or host 28.

Calls may be received by the organization from clients 20, 22 or the organization may place calls to clients or potential clients 20, 22. In the case of calls received from clients 20, 22 through the PSTN 26, the calls may be detected by the ACD 30 along with call associated information (e.g., ANI, DNIS, etc.). The ACD 30 and/or host 28 may select an agent to handle the call based upon the call associated information. Where the organization uses a number of different telephone numbers, the DNIS information may be used to determine a subject matter of the call based upon the number dialed. Similarly, ANI may be used to identify a subject matter of the call based upon the identity of the caller and past dealings with the client 20, 22.

The organization may also purchase lists of telephone numbers of potential clients 20, 22 and place calls to the clients 20, 22 to advance the agenda of the organization. In this case, the ACD 30 and/or host 28 may select an agent 12, 14, 16 based upon the purpose of the call.

Similarly, the organization may receive or place packet calls through the Internet 24. An agent 12, 14, 16 may be selected based upon the purpose of the call. In this case, the address of the packet call may be used as a first indicator of the purpose of the call and the source URI or URL may be used to identify the caller.

Alternatively, calls may be initiated via the client 20, 22 visiting a web site 50 of the organization and activation of a SPEAK WITH AGENT softkey displayed on a web page downloaded to the client 20, 22 from the web site 50. The purpose of the call, in this case, may be determined based upon the web page from which the call originated.

Selection of an agent to handle a call may be based upon an identification of the most skilled agent based upon the determined purpose of the call or identity of the client or upon any other criteria. Upon selection of an agent, a notification of the call may be delivered to a terminal of the agent (as a call appearance) along with a call identifier (e.g., a source identifier of the call, a unique call number associated with the call by the host 28 or ACD 30, etc.). The call appearance may be delivered as an icon (e.g., a screen pop) displayed on the screen that the agent may select to accept delivery of the call.

As calls are delivered to the agents 12, 14, 16, the agent may converse with the client 20, 22 and make further determinations about the purpose of the call. As the agent handles the call, the agent may access a first computer program (application) for purposes of retrieving client records from a client database 52. The agent may also access a second application for purposes of identifying and retrieving information requested by the client from a subject matter data base 54.

Depending upon the agenda of the organization, the agent may enter into one or more transactions with the client. In this case, the agent may access a transaction processing application. The results of the transaction may be entered into a transaction data base.

Alternatively, the call may be an inquiry as to the status of the transaction. In this case, the agent may access a transaction tracking application that tracks the status of the transaction.

Compounding the problem of tracking agent activity is the fact that agents often handle more than one call at a time. An example of this could be where an agent 12, 14, 16 is concurrently servicing two chat session calls with two different clients 20, 22 or where the agent 12, 14, 16 is concurrently servicing two chat session calls with two different clients 20, 22 while also servicing an e-mail call with a third client 20, 22. The agent is able to concurrently handle multiple calls because after sending a chat message to one client 20, 22, the agent is able to read and respond to a chat message from another client while waiting for a response from the first client. In these cases, each call is referred to as an appearance and the agent is referred to as a multi-appearance agent 12, 14, 16.

Under one illustrated embodiment, the system 10 monitors the agent's terminal 16, 40, 42 for selection of a call and then tracks activity based upon the selection. Every time that the agent changes his focus to another client 20, 22, an event message 146 is generated and sent to the host 28. The event message may contain the time of the selection and an identifier of the call (e.g., a call identifier assigned by the host 28 or ACD 30, an identifier of the client 20, 22, etc.). The system 10 measures time beginning with call selection and saves the accumulated "active" time in a file allocated to the selected call. The host 28 accumulates this time as the time that the agent was "active" and "focused" on the call. Similarly, the other call appearances (i.e., non-selected calls) accumulate this time as "active" but "unfocused."

It should also be noted that an event message can be generated each time the agent's attention changes, even while focused on the same client. Focus, in this context, refers to the call being handled by the agent. In this regard, the agent's attention changes each time the agent selects a different application while the agent's focus may remain the same.

Change of agent focus can be detected in any of a number of different ways. Under one embodiment, focus can be detected by the agent's interaction with a graphical user interface (GUI) (e.g., within a Windows environment) by monitoring the agent's use of the computer mouse. In this case, a monitoring application may be launched within the agent's browser or within the Windows operating system to detect selection of a window associated with each application. When each change of focus or change in attention is detected, an event message may be sent to a tracking application within the agent's terminal or within the host 28.

Figure 2:
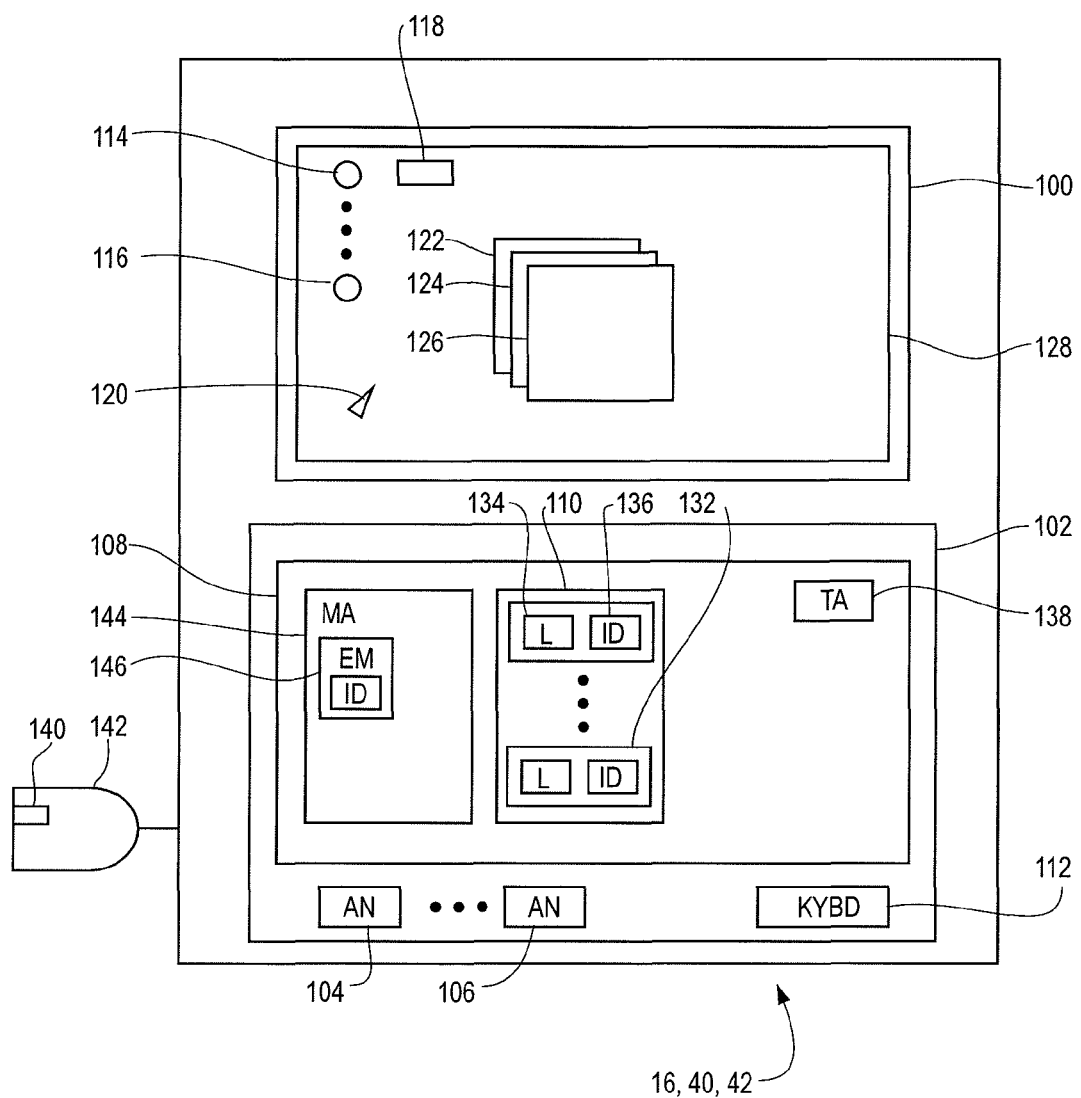
FIG. 2 is an agent terminal and associated display used in conjunction with the system of FIG. 1.

Turning now to the system 10 for monitoring agent activity, in specific, FIG. 2 is a block diagram of an agent terminal 16, 40, 42. Included within one or more of the terminals 16, 40, 42 may be a display 100 and a central processing unit (CPU) 102.

Shown on the display 100 may be a system interface window 128 generated under an appropriate operating environment controlled by an interface system (e.g., a browser, a Windows operating system, etc.) 108. In general, the system 10 will operate in either environment.

Operating within the CPU 102 may be a number of computer programs (applications) 104, 106, as discussed above. The applications 104, 106 may be activated via selection of an identifier of the application 104, 106 within a drop down menu 118 or by selection of an icon 114, 116. At least some of the icons 114, 116 may be directed to applications retrieved from a memory of the terminal 16, 40, 42. Alternatively, at least some of the icons 114, 116 may be call appearances routed to the terminal 16, 40, 42 by the host 28 that, in turn, trigger corresponding applications 104, 106 (e.g., an OUTLOOK application within Microsoft Windows, etc.).

Selection of an application 104, 106 may be accomplished by placing a focus device (e.g., a cursor, joystick, pen, touch screen, etc.) over the application and activating a switch associated with the focus device. Under one illustrated embodiment, selection may be accomplished by placing a cursor 120 over the identifier or icon 114, 116 and activating a switch 140 on the computer mouse 142. The applications 104, 106 may also be activated by entry of a specific sequence of characters through a computer keyboard 112.

Once activated, the interface system 108 operating in conjunction with the application 104, 106 generates an application window 122, 124, 126 within the system interface 128. The interface system 108 may also generate a lookup table 110 of the application windows 122, 124, 126. Included within the lookup table 110 may be a file 130, 132 for each application window 122, 124, 126. Included within each file 130, 132 may be at least a location 134 of the window 122, 124, 126 on the display 100 and an identifier 136 of the application 104, 106 and/or an identifier of (or a reference to) the call appearance that generated the respective window 122, 124, 126. The location 134 may be provided by a Windows handler or in other environments, for example, as a set of coordinates that define an outer periphery of the window 122, 124, 126 or identifiers of a set of pixels that lie within the outline of the window 122, 124, 126.

Once activated, an application 104, 106 (and corresponding window 122, 124, 126) may remain in the foreground as the focused application or may be changed to a background application by selection of another application 104, 106. Selection of a window 122, 124, 126 for moving an application 104, 106 to the foreground as the focused application may be detected by a tracking processor 138.

The tracking processor 138 monitors a position of the cursor 120 and a state of the switch 140 and provides a position indication (e.g., coordinates) to a monitoring application 144 when the switch 140 is activated. Upon detecting activation of the switch 140, the monitoring application 144 sequentially compares the location of the cursor 120 with the locations 134 of each of the windows 122, 124, 126. If the monitoring application 144 should detect that the cursor 120 overlaps one of the windows 122, 124, 126, then the monitoring application 144 composes an event message 146 for transfer to an agent activity processor 60 located within either the terminal 16, 40, 42 of the agent or within the host 28.

In addition to including an identifier of the application and time of selection of the application 104, 106, the monitoring application 144 may also include an identifier of a call appearance within the event message 146. The identifier of the call appearance may be a source identifier of the call (e.g., a URL, URI, telephone number, etc.) or a unique call identifier assigned by the host 28 or ACD 30.

Upon receipt of the event message, the agent activity processor 60 will first attempt to identify any calls that correspond to the selected application. More specifically, the agent activity processor 60 determines if the event message 146 corresponds to a call appearance. The processor 60 may make this determination by comparing any call appearance identifier or reference contained within the event message 146 with call appearance entries 64, 66 contained within a list 62 of calls assigned to the agent 12, 14, 16.

If the agent activity processor 60 is able to match the event message 146 with a call appearance, then the processor 60 may open a new tracking file 72, 74 or identify an already existing tracking file 72, 74 for the call and the agent associated with the terminal 16, 40, 42. The processor 60 may also activate a timer 68 to accumulate and track the total time that the agent spends handling the call.

The agent activity processor 60 may also set a flag identifying and classifying the newly created or identified file 72, 74 as the primary tracking file for the agent. In this case, the primary tracking file collects event messages for any application 104, 106 opened by the agent for as long as the agent continues to handle the call associated with the tracking file 72, 74. At the same time that any new file 72, 74 is identified as a primary tracking file 72, 74, any previously classified primary tracking files 72, 74 are reclassified as secondary tracking files to indicate that the agent is no longer actively handling that call and is now handling another call.

If the agent activity processor 60 is not able to match the event message 146 with a call appearance, then the activity processor 60 may add the event message to the most recently identified primary tracking file 72, 74. In this case, the message would include an identifier of the application 104, 106 and a time of selection of the application 104, 106.

The agent activity processor 60 is able to accurately track agent activity relating to calls for a number of reasons. For example, if the agent is concurrently handling a number of chat sessions, then the agent would first click on the call appearance window 122, 124, 126 of the chat session to review the last message from the client 20, 22. Opening the call appearance window 122, 124, 126 allows the agent tracking processor 60 to re-classify the tracking file 72, 74 associated with the chat session as the primary tracking file. Clicking on the call appearance window 122, 124, 126 also allows the agent to open a sub-window for entry of a response.

However, once the agent has opened the call appearance window 122, 124, 126, the agent may also perform other tasks without changing the identity of the primary tracking file 72, 74. For instance, if the agent is uncertain how to answer the previous instant message, then the agent may perform research that is added to the primary tracking file 72, 74. For example, if a chat message from the client 20, 22 should be in inquiry about a previous transaction, the agent may access a transaction search application 104, 106 to find an answer to the question from the client 20, 22. Since the chat session tracking file 72, 74 has already been classified as the primary tracking file 72, 74, the time spent by the agent in researching the question is added to the primary tracking file 72, 74 even though the event message caused by activation of the search application was not directly associated with the chat session.

The use of the tracking files 72, 74 allows agent activity to be tracked in a way not previously available. Once created, the tracking files 72, 74 can be analyzed by a reporting application to identify software deficiencies and the need for agent training. For example, call appearances can be segregated by call type (e.g., chat, e-mail, voice, etc.). The total time spent on each call appearance by call type can be determined and averaged among many calls and among many clients and agents. Agents who spend excessive time on one call or client type can be scheduled for training. Similarly, applications 104, 106 that require excessive time or are not used at all can be identified and upgraded or eliminated.

A specific embodiment of method and apparatus for tracking agent activity has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of monitoring activities of a plurality of agents servicing a plurality of calls for an organization, said method comprising:
   monitoring a plurality of applications concurrently activated on a terminal of an agent of the plurality of agents, the agent concurrently handling a plurality of calls of a common media type;
   detecting selection of an application of the plurality of concurrently activated applications including comparing a location of a cursor with a location of a window or icon of at least one of the plurality of applications and generating an event message including a time of selection and an identifier of the application selected in response thereto;
   determining whether a call of the concurrently handled plurality of calls of the common media type is associated with the selected application, and identifying a tracking file for the call if one exists and otherwise creating the tracking file for the call;
   saving a time of selection and an identifier of the selected application in the respective tracking file or database of the call for future retrieval;
   accumulating time the agent was active and focused on the call and separately accumulating time the agent was active but unfocused on the call, and generating the event message each time agent attention changes while the agent remains focused on the call;
   classifying the tracking file of the call as a primary file for the agent and collecting any event messages in the primary file for as long as the agent continues actively handling the call;
   reclassifying as a secondary file any tracking file previously classified as a primary file, and adding any event messages to the primary file including the identifier of the application and the time of selection if there is no call associated with the application selection.

2. The method of monitoring activities as in claim 1 wherein the step of monitoring further comprising detecting activation of a switch on a computer mouse of the terminal.

3. The method of monitoring activities as in claim 1 further comprising determining that the selected application corresponds to a call appearance of the identified call.

4. The method of monitoring activities as in claim 3 further comprising determining a total time spent on each call type of the plurality of calls.

5. The method of monitoring activities as in claim 4 wherein the step of identifying the call further comprising comparing a call appearance identifier of the application with identifiers of a list of calls assigned to the agent to determine if the event message of the selected application corresponds to the call appearance.

6. The method of monitoring activities as in claim 5 further comprising opening the respective file upon the first instance of the call appearance.

7. An apparatus for monitoring activities of a plurality of agents servicing a plurality of calls for an organization, said apparatus comprising:

means for monitoring a plurality of applications concurrently activated on a terminal of an agent of the plurality of agents, the agent concurrently handling a plurality of calls of a single common media type;

means for detecting selection of an application of the plurality of concurrently activated applications including comparing a location of a cursor with a location of a window or icon of at least one of the plurality of applications and for generating an event message including a time of selection and an identifier of the application selected in response thereto;

means for determining whether a call of the concurrently handled plurality of calls of the common media type is associated with the selected application and for identifying a tracking file for the call if one exists and otherwise creating the tracking file for the call;

means for saving a time of selection and an identifier of the application in a respective file or database of the identified call for future retrieval;

means for accumulating time the agent was active and focused on the call and separately accumulating time the agent was active but unfocused on the call, and generating the event message each time agent attention changes while the agent remains focused on the call;

means for classifying the tracking file of the call as a primary file for the agent and collecting any event messages in the primary file for as long as the agent continues actively handling the call; and means for reclassifying as a secondary file any tracking file previously classified as a primary file, and for adding any event messages to the primary file including the identifier of the application and the time of selection if there is no call associated with the application selection.

8. The apparatus for monitoring activities as in claim 7 wherein the means for monitoring further comprising means for detecting activation of a switch on a computer focus device of the terminal.

9. The apparatus for monitoring activities as in claim 7 further comprising means for determining that the selected application is a call appearance of the identified call.

10. The apparatus for monitoring activities as in claim 9 further comprising means for determining a total time spent on each call type of the plurality of calls.

11. The apparatus for monitoring activities as in claim 10 wherein the means for identifying the call further comprising means for comparing a call appearance identifier of the application with identifiers of a list of calls assigned to the agent.

12. The apparatus for monitoring activities as in claim 11 further comprising means for opening the respective file upon the first instance of the call appearance.

13. An apparatus for monitoring activities of a plurality of agents servicing a plurality of calls for an organization, said apparatus comprising:

a monitoring application that monitors a plurality of applications on a terminal of an agent of the plurality of agents, the agent concurrently handling a plurality of calls of a common media type;

a switch on a focus device of the terminal that detects selection of an application of the plurality of applications and generates an event message including a time of selection and an identifier of the application selected in response thereto;

a tracking file that identifies a call of the concurrently handled plurality of calls of the common media type associated with the selected application;

an agent activity processor that saves a time of selection and an identifier of the application in a tracking file of the identified call;

the activity processor accumulating time the agent was active and focused on the call and separately accumulating time the agent was active but unfocused on the call, and generating the event message each time agent attention changes while the agent remains focused on the call, and classifying the tracking file of the call as a primary file for the agent and collecting any event messages in the primary file for as long as the agent continues actively handling the call; and the activity processor reclassifying as a secondary file any tracking file previously classified as a primary file, and adding any event messages to the primary file including the identifier of the application and the time of selection if there is no call associated with the application selection.

14. The apparatus for monitoring activities as in claim 13 wherein the monitoring further comprising a lookup table comparing a location of the cursor with a location of a window or icon of each of the plurality of applications.

15. The apparatus for monitoring activities as in claim 13 wherein the selected application further comprises a call appearance of the identified call.

16. The apparatus for monitoring activities as in claim 15 further comprising the activity processor determining a total time spent on each call type of the plurality of calls.

\* \* \* \* \*